United States Patent [19]

Gradek et al.

[11] 4,326,655
[45] Apr. 27, 1982

[54] VEHICLE ROOF CARRIER FOR SKIS AND SKI POLES

[75] Inventors: Walter A. Gradek; John W. Boggs, both of Lexington, Ky.

[73] Assignee: Foam Design, Incorporated, Lexington, Ky.

[21] Appl. No.: 229,959

[22] Filed: Jan. 30, 1981

[51] Int. Cl.³ .............................................. B60R 9/12
[52] U.S. Cl. .................................... 224/324; 224/322; 224/323; 224/917; 211/60 SK
[58] Field of Search ............... 224/324, 322, 323, 325, 224/329, 917; 211/60 SK

[56] References Cited

U.S. PATENT DOCUMENTS

| 2,988,253 | 6/1961 | Menghi | 224/324 X |
| 3,348,747 | 10/1967 | Vuarchex | 224/323 X |
| 3,848,785 | 11/1974 | Bott | 224/917 X |
| 3,902,641 | 9/1975 | Peasley | 224/322 X |

FOREIGN PATENT DOCUMENTS

| 177071 | 12/1953 | Fed. Rep. of Germany | 224/324 |
| 1373117 | 7/1966 | France | 224/324 |

*Primary Examiner*—Steven M. Pollard
*Attorney, Agent, or Firm*—Frank C. Leach, Jr.

[57] ABSTRACT

A carrier has a pair of bodies mounted on a vehicle roof in spaced longitudinal relation. Each of the bodies is mounted on the roof by a strap extending through a transverse passage in the body and having a pair of gutter hooks, one fixed on the strap and the other adjustable on the strap, for engaging gutters on opposite sides of the vehicle. The upper wall of each of the bodies has a plurality of substantially parallel longitudinal passages to support skis therein. Each of the bodies has a plate disposed thereabove and resting on the skis disposed in the longitudinal passages with the plate having a slot in each end to receive opposite ends of the strap. Ski poles may be supported on the upper surface of each of the plates and retained by the strap when the ends of the strap are clamped to each other.

31 Claims, 10 Drawing Figures

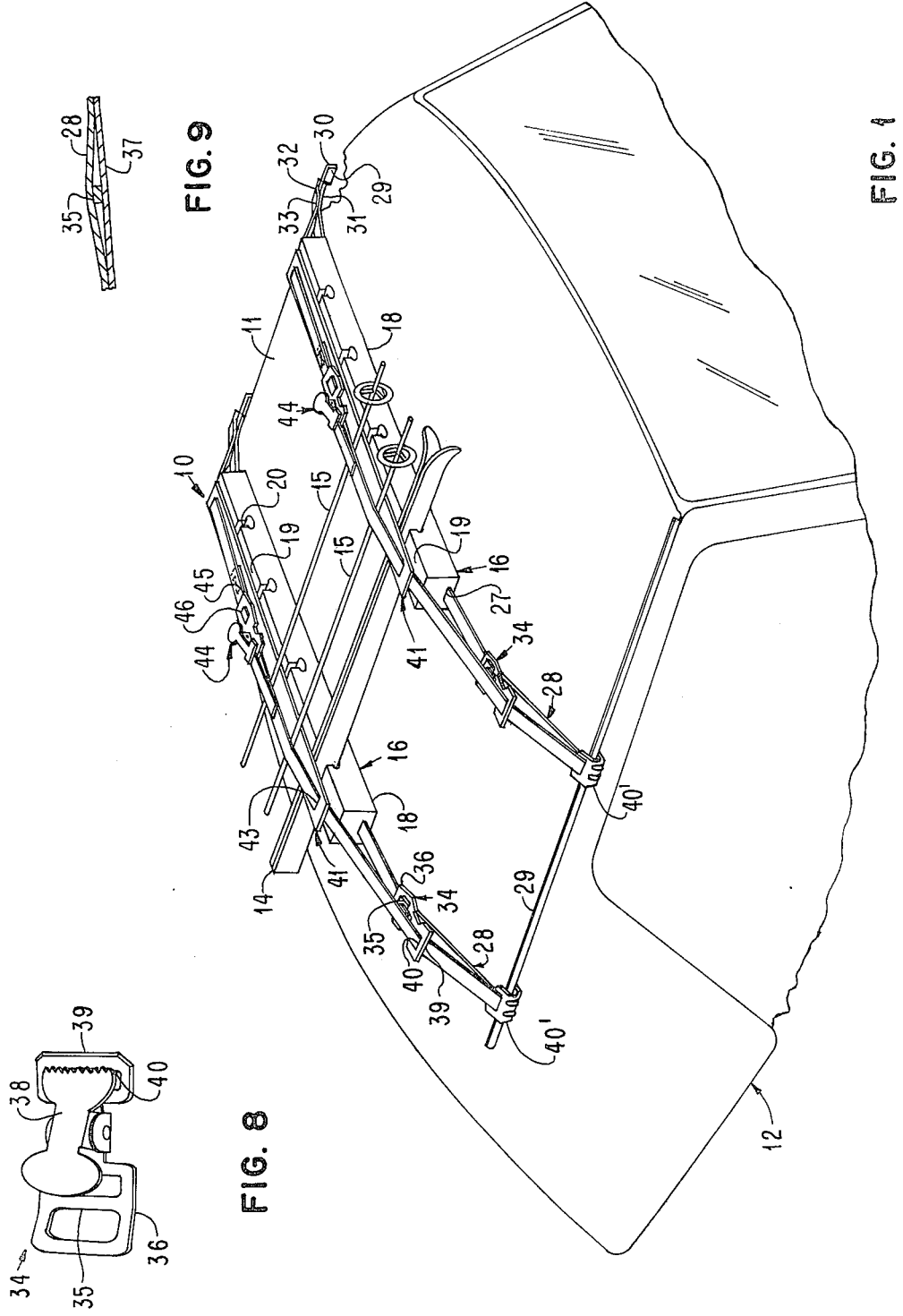

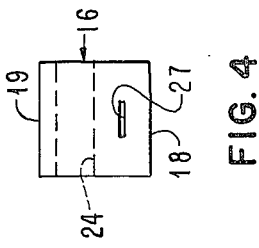
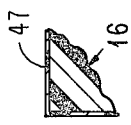
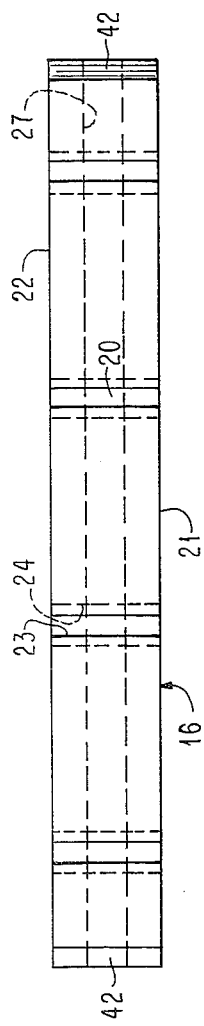
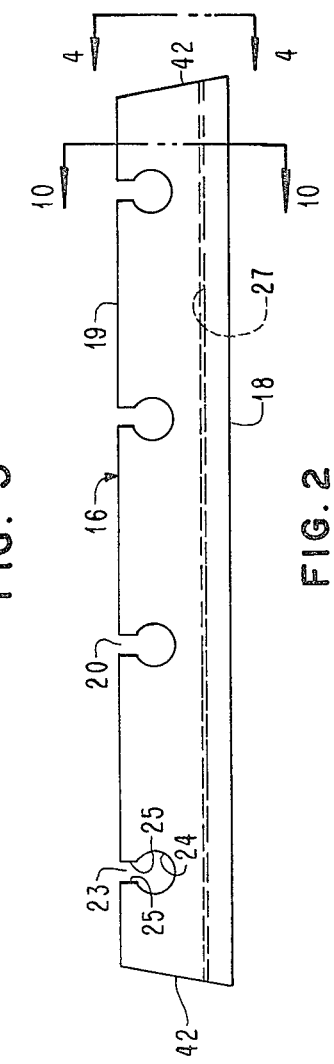
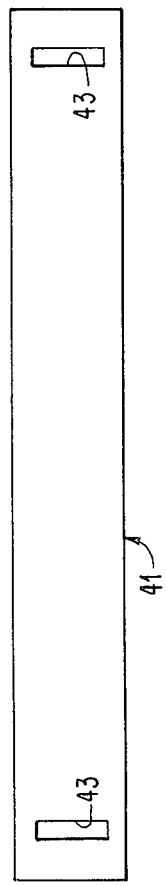

VEHICLE ROOF CARRIER FOR SKIS AND SKI POLES

This invention relates to an article carrier for mounting on a vehicle roof and, more particularly, to a vehicle roof carrier for skis and ski poles.

Carriers for supporting skis in suspended relation above the roof of a vehicle are disclosed in U.S. Pat. No. 2,235,012 to Colvin, U.S. Pat. No. 2,752,079 to Merrill, U.S. Pat. No. 2,782,793 to Lang, U.S. Pat. No. 3,348,747 to Vuarchex, and U.S. Pat. No. 3,833,160 to Andersson. The carrier of each of the aforesaid Vuarchex and Andersson patents also is capable of supporting ski poles at the same time.

Thus, the carrier of each of the aforesaid Vuarchex and Andersson patents has more utility than the carrier of each of the aforesaid Colvin, Merrill, and Land patents because of the capability of supporting ski poles along with the skis. Because the carrier of each of the aforesaid Colvin, Merrill, and Lang patents has no arrangement for supporting ski poles, its utility is limited.

Because the roofs of automobiles have various widths and the width of a vehicle roof may vary along its length rather than being constant, it is necessary to be able to mount the carrier on an automobile roof irrespective of its width. In the aforesaid Vuarchex patent, this adaptability is accomplished through telescoping members that must be secured together by screws to obtain the adjusted width.

This arrangement for adjusting the width of the carrier in the aforesaid Vuarchex patent has the disadvantage of possibly requiring adjustment of the telescoping members each time that the carrier is removed from the vehicle roof and mounted again on the vehicle roof. This is particularly true where the width of the vehicle roof varies along its length.

Because it is necessary to remove the carrier of the aforesaid Vuarchex patent when skiing or it may be stolen, this necessity for changing the width of the carrier is most difficult in a cold climate as is usually encountered in snow skiing. The carrier of the aforesaid Vuarchex patent also requires a screw driver to adjust the positions of the telescoping members.

Furthermore, to retain the skis and ski poles within the carrier, the aforesaid Vuarchex patent employs pivotally mounted levers. These levers must be locked in position so that this is a further disadvantage because the locking mechanism may freeze due to the temperature in the area in which snow skiing occurs.

The carrier of the aforesaid Andersson patent includes a supporting tube having feet telescoping into opposite ends of the tube. There is no explanation of how the feet are adjustably telescoped and retained in position within the tube. However, the supporting tube is mounted in spaced relation to the roof of the vehicle so that air flow can enter thereunderneath. This subjects the carrier and the articles supported thereby to an additional aerodynamic force, particularly when the skis are mounted with their surfaces horizontal rather than vertical.

The carrier of the aforesaid Andersson patent requires manual adjustment of clamp mountings along the supporting tube with elastomeric clamp straps being supported by the clamp mountings for retaining the skis and the ski poles between the straps and the supporting tube.

The employment of the manually movable clamp mountings in the aforesaid Andersson patent has the disadvantage of possibly requiring adjustment in extremely cold weather. Thus, the clamp mountings can become frozen in a position so as to be incapable of being moved manually.

Furthermore, the mounting of each of the supporting tubes of the aforesaid Andersson patent also can damage the roof of the vehicle when positioning each of the supporting tubes of the carrier on top of the vehicle. This is particularly true if only one person is attempting to mount the carrier on the vehicle roof.

The carrier of the aforesaid Lang patent has a pair of longitudinally spaced racks mounted in spaced relation to the vehicle roof through suction cups and straps. The suction cups enable the racks to be mounted without damage to the roof. However, if the carrier is removed while skiing, the roof may become covered with ice and/or snow; if the ice and/or snow cannot be completely removed, the suction cups may not be effective.

Furthermore, each pair of skis must be mounted between a pair of vertical arms on the rack and then retained by a strap, which must be fed through various retaining loops. This may be difficult to accomplish in a cold climate.

The carrier of the aforesaid Lang patent also has the disadvantage of not being capable of supporting ski poles. Thus, its utility is limited.

Additionally, the carrier of the aforesaid Lang patent has the rack disposed in suspended relation to the vehicle roof. Therefore, the potential undesirable aerodynamic effects again exist as with the carrier of the aforesaid Andersson patent.

The carrier of the aforesaid Merrill patent has the skis retained between two bars which are secured to each other by toggles at each end and a clamp in the middle. Furthermore, suction cups are required to support the two bars in spaced relation to the vehicle roof.

Thus, since the skis apparently can be mounted only with their surfaces horizontal, the carrier of the aforesaid Merrill patent has the disadvantage of the potential aerodynamic effects through being spaced from the vehicle roof. It also has the disadvantage of requiring the suction cups for mounting on the vehicle roof.

Because of the clamping arrangement between the two bars, the carrier of the aforesaid Merrill patent is not capable of transporting ski poles. This is because the articles disposed between the two bars must be of the same size. Therefore, the carrier of the aforesaid Merrill patent is not capable of transporting both skis and ski poles simultaneously.

The carrier of the aforesaid Colvin patent requires a specially designed elastic binding element to be wrapped around the skis in a specific manner. This specific wrapping arrangement in the cold climate in which one has been skiing is a rather difficult process. Furthermore, the coldness of the user's hands may preclude the capability of being able to effectively wrap the elastic binding element in the precise manner to retain the skis in position.

The carrier of the present invention overcomes the disadvantages of the aforesaid patents in that it may be mounted directly on the roof of a vehicle without any damage to the vehicle. The carrier of the present invention may be easily mounted on the vehicle roof by a single person.

The carrier of the present invention also is capable of being easily mounted on a vehicle roof of any width.

There is no necessity for an mechanical tool such as the screw driver in the aforesaid Vuarchex patent, for example.

The carrier of the present invention also is not suspended in spaced relation to the vehicle roof. Thus, any possible undesirable aerodynamic effects produced by suspending the carrier above the vehicle roof is avoided.

The carrier of each of the aforesaid Colvin, Merrill, Lang, and Vuarchex patents requires a plurality of parts. In comparison with each of these carriers, the carrier of the present invention is relatively inexpensive since each of the two support portions of the carrier comprises only three relatively inexpensive elements.

While the carrier of the aforesaid Andersson patent appears to employ relatively inexpensive parts, it requires a substantially greater number of parts than the carrier of the present invention. Thus, the carrier of the aforesaid Andersson patent requires at least two different types of strap mountings in addition to the supporting tube, the telescoping feet, the structure for securing the telescoping feet to the supporting tube, and the clamp straps. Therefore, the carrier of the aforesaid Andersson patent is deemed to be more expensive than the carrier of the present invention.

The carrier of the present invention uses only a body, a plate, and a strap at each of the two longitudinally spaced positions on the vehicle roof at which the skis and the ski poles are supported. Thus, these small number of parts may be easily stored in the vehicle while skiing. They also may be easily mounted or removed by one person without any damage to the vehicle roof.

The avoidance of damage to the vehicle roof is accomplished through forming a body, which supports the skis, of a lightweight resilient material such as a plastic foam, for example, that will not harm the vehicle roof.

The use of a strap to attach the body of the carrier to the vehicle roof enables a quick attachment. This also allows easy mounting of the bodies of the carrier for different widths of the vehicle roof through merely changing the position of an adjustable gutter hook on the strap.

One other type of ski carrier has utilized a pair of bodies formed of a plastic foam to receive skis in a plurality of substantially parallel longitudinal passages in the upper wall of each of the bodies. Each of the bodies has a slot in its upper wall extending transversely through each of the longitudinal passages.

After disposing the bodies on the vehicle roof, the skis must be positioned in the longitudinal passages before the bodies are attached to the vehicle. Then, a rope is connected to a gutter hook, which is secured to the gutter on one side of the vehicle. The rope then extends through a very small portion of the transverse slot in the upper wall of the body on one end of the body exterior of the outboard longitudinal passage for the skis and over the skis and then through a very small portion of the slot on the other end of the body exterior of the outboard longitudinal passage for the skis. This end of the rope is then secured to another gutter hook, which is attached to the gutter on the other side of the vehicle.

During the positioning of the rope in the transverse slot in each of the bodies and connecting to the gutter hooks, the possibility exists that the skis, which must be disposed in the longitudinal passages prior to positioning the rope in the transverse slot, may tip. If this occurs, the vehicle roof may be easily damaged.

Furthermore, to be able to mount the previously available ski carrier on the vehicle roof without any possibility of damage to the vehicle roof requires at least three persons. It would be necessary for a person to hold each end of the skis with each of these persons holding one of the two bodies in which the skis are disposed in position on the vehicle roof while the third person places the rope in position.

Thus, this prior ski carrier is not capable of being easily mounted by one person if it can even be accomplished by one person. Furthermore, the very small amount of the rope in the transverse slot can easily result in the rope becoming dislodged from the slot. This is particularly true if the skis are sufficiently wide so as to extend above the upper wall of the body when the skis are disposed in one of the longitudinal passages in the body.

While this previously available ski carrier is relatively inexpensive in the same manner as is the ski carrier of this invention, it is questioned that it can be handled by a single person. If the previously available ski carrier can be installed by a single person, there is a strong likelihood of damage to the vehicle roof. Furthermore, the bodies of the previously available ski carrier may become dislodged. Another difficulty is that the connection of the rope to the gutter hooks cannot always be easily obtained, particularly in a cold climate.

The previously available ski carrier also has the disadvantage of not being able to support any ski poles. Thus, the previously available ski carrier is not capable of enabling support of both skis and ski poles simultaneously as is the ski carrier of the present invention.

An object of this invention is to provide a carrier for skis and ski poles for mounting on a vehicle roof.

Another object of this invention is to provide a body for supporting skis on a vehicle roof.

A further object of this invention is to provide a simple arrangement for retaining elements of an article carrier on a vehicle roof irrespective of the width of the vehicle roof.

Still another object of this invention is to provide a relatively inexpensive carrier for skis and ski poles for mounting on a vehicle roof.

Other objects of this invention will be readily perceived from the following description, claims, and drawings.

This invention relates to a carrier for supporting skis on a vehicle roof including a body of resilient material having a bottom wall for engaging the vehicle roof on which the body is to be mounted transversely. The body has an upper wall, which is substantially parallel to the bottom wall, with a plurality of substantially parallel longitudinal passages therein to receive skis therein for support by the body. Each of the longitudinal passages has a first cross sectional portion communicating with the upper wall and a second cross sectional portion communicating with the first cross sectional portion. The first cross sectional portion of the longitudinal passage is smaller than the second cross sectional portion of the longitudinal passage to grip skis disposed in the longitudinal passage. The body has a transverse passage extending transversely to the longitudinal passages to receive means to releasably secure the body to the vehicle on which the body is to be mounted with the transverse passage being disposed beneath the bottom of each of the longitudinal passages.

This invention also relates to a carrier for supporting skis and ski poles on a vehicle roof including a body of resilient material having a bottom wall for engaging the vehicle roof on which the body is to be mounted transversely. The body has an upper wall, which is substantially parallel to the bottom wall, with receiving means to receive skis therein for support by the body. The body has a transverse passage extending transversely to the receiving means and beneath the receiving means to receive means to releasably secure the body to the vehicle. The carrier includes a plate for disposition on the skis disposed in the receiving means in the body to support ski poles disposed on the plate. The plate has means at each end to receive the means to releasably secure the body to the vehicle to also releasably secure the plate and ski poles supported on the plate to the vehicle.

The attached drawings illustrate a preferred embodiment of the invention, in which:

FIG. 1 is a perspective view of a carrier of the present invention mounted on a roof of an automobile and having skis and ski poles supported thereby;

FIG. 2 is a front elevational view of a body of the carrier of the present invention;

FIG. 3 is a top plan view of the body of FIG. 2;

FIG. 4 is an end elevational view of the body of FIG. 2 and taken along line 4—4 of FIG. 2;

FIG. 5 is a top plan view of a plate of the carrier of the present invention on which ski poles are supported;

FIG. 6 is a front elevational view of the plate of FIG. 5;

FIG. 7 is a top plan view of a gutter hook utilized with the carrier of the present invention;

FIG. 8 is a perspective view of a clamp utilized with the carrier of the present invention;

FIG. 9 is a fragmentary elevational view, partly in section, of a part of one of the clamps and its attachment to a strap; and FIG. 10 is a fragmentary sectional view showing a coating on a body of the carrier of the present invention and taken substantially along line 10—10 of FIG. 2.

Referring to the drawings and particularly FIG. 1, there is shown a carrier 10 mounted on a roof 11 of a vehicle 12 such as an automobile, for example. The carrier 10 supports both skis 14 and ski poles 15.

The carrier 10 includes a pair of bodies 16 mounted on the vehicle roof 11 in spaced longitudinal relationship to each other. Each of the bodies 16 is identical and is formed of a lightweight resilient material such as a suitable plastic foam. One example of the plastic foam is cross linked polyethylene foam.

Each of the bodies 16 has its bottom wall 18, which is substantially parallel to its upper wall 19, mounted in engagement with the vehicle roof 11. Because of being formed of the plastic foam, for example, the body 16 cannot damage the vehicle roof 11.

The upper wall 19 of each of the bodies 16 has a plurality (four shown) of substantially parallel longitudinal passages 20 therein extending from front wall 21 (see FIG. 3) of the body 16 to rear wall 22 of the body 16. Each of the passages 20 includes a first or upper cross sectional portion 23 (see FIG. 2) and a second or lower cross sectional portion 24.

Each of the first cross sectional portions 23 is a slot extending into the body 16 from the upper wall 19 and having a pair of substantially parallel side walls 25. The second cross sectional portion 24 of each of the passages 20 is defined by an arc of a circle.

The radius of the circle of the second cross sectional portion 24 is greater than the distance between the side walls 25 of the first cross sectional portion 23 of each of the passages 20. For example, the radius of the circle having an arc define the second cross sectional portion 24 may be 9/16" while the distance between the side walls 25 of the first cross sectional portion 23 of the passage 20 is 0.5" with each of the side walls 25 extending for ⅜" from the upper wall 19.

The center of the circle having an arc define the second cross sectional portion 24 of each of the passages 20 is preferably disposed 1" from the upper wall 19. This position of the center of the circle must be disposed so that downward pressure may be exerted on the skis 14 (see FIG. 1) when disposed in one of the longitudinal passages 20 (see FIG. 3).

By forming the body 16 of a resilient material such as plastic foam, for example, the skis 14 (see FIG. 1) are gripped between the side walls 25 (see FIG. 2) of the first cross sectional portion 23 of the longitudinal passage 20 when two of the skis 14 (see FIG. 1) are disposed therein. Thus, the skis 14 are positively retained in the body 16.

The body 16 has a very thin transverse passage 27 (see FIG. 2) extending therethrough beneath the bottom of each of the longitudinal passages 20. The transverse passage 27, which is substantially orthogonal to each of the longitudinal passages 20, has a depth of about 1/16".

The transverse passage 27 receives a cloth strap 28 (see FIG. 1), which is utilized to releasably secure the body 16 to a gutter or drain molding 29 on each side of the vehicle roof 11. The strap 28 is disposed within the transverse passage 27 in the body 16 during assembly and is capable of sliding therein.

After the strap 28 is passed through the transverse passage 27 in the body 16 during assembly, a gutter hook 30 is fixed to the strap 28 at a selected position and retained at this position through sewing adjacent portions 31 and 32 of the strap 28 to each other at 33. Thus, the gutter hook 30 is specifically located on the strap 28.

The other end of the strap 28 has a clamp 34 fixed thereon at a specific location. The clamp 34 is held in the fixed position on the strap 28 through having a portion 35 (see FIGS. 8 and 9) of a body 36 of the clamp 34 positioned between the strap 28 (see FIG. 9) and a strap 37, which is preferably the same material as the strap 28, sewed to the strap 28 to form a closed loop within which the portion 35 of the body 36 (see FIG. 8) of the clamp 34 is disposed. The clamp 34 has a pivotally mounted gripping element 38, which holds the strap 28 (see FIG. 1) against a portion 39 of the body 36 of the clamp 34 when the strap 28 passes through an opening 40 in the portion 39 of the body 36.

A second gutter hook 40', which is the same as the gutter hook 30, is disposed on the strap 28 between the strip 37 (see FIG. 9) and the portion 39 (see FIG. 1) of the body 36 of the clamp 34 for gripping the gutter or drain molding 29 on the side of the vehicle roof 11 opposite to the gutter 29 cooperating with the gutter hook 30. Therefore, the clamp 34, which cooperates with the portion of the strap 28 between the second gutter hook 40' and the end of the strap 28 enables shifting of the position of the gutter hook 40' along the strap 28. Thus, easy adjustability of the distance along the strap 28 between the two gutter hooks 30 and 40' is obtained. The position of the fixed gutter hook 30 from the end of the body 16 is adjustable through sliding the strap 28 in the transverse passage 27 in the body 16. Accordingly, the body 16 may be easily positioned on the vehicle roof 11 irrespective of its width.

The carrier 10 also includes a plate 41, which functions as a pole rest. The plate 41 is formed of an extruded corrugated polypropylene rigid sheet sold under the trademark PRIME COR-X by Primex Plastics Corp., Oakland, N.J., for example.

The plate 41 is the same width as the upper wall 19 of the body 16. As shown in FIG. 2, the upper wall 19 of the body 16 is slightly shorter in width than the bottom wall 19. This results in end walls 42 of the body 16 being inclined.

The plate 41 (see FIG. 5) has a slot 43 adjacent each of its ends. Each of the slots 43 receives one of the ends of the strap 28 (see FIG. 1).

The end of the strap 28 having the gutter hook 30 fixed thereto has a second clamp 44, which is the same as the clamp 34, secured to its free end. Thus, each of the slots 43 in the plate 41 must be capable of enabling the second clamp 44 to pass therethrough.

The second clamp 44 is secured to the end of the strap 28 through the end of the strap 28 being looped and sewed at 45 to form a closed loop 46 at the end of the strap 28. The closed loop 46 at the end of the strap 28 has the portion 35 of the body 36 of the second clamp 44 therein to connect the second clamp 44 to the strap 28.

After the strap 28 has its ends passed through the slots 43 in the plate 41, the ski poles 15 (see FIG. 1) may be positioned on top of the plate 41. Then, the ends of the strap 28 are secured to each other by the second clamp 44.

While the plate 41 is a rigid sheet, it is bendable. Thus, the plate 41 can bend from each end, if necessary, to be slightly curved to accommodate, to a degree, the various protrusions of the skis 14 to aid in retaining them in the body 16 therebeneath.

Each of the bodies 16 and each of the plates 41 are provided with a suitable pigment to prevent ultraviolet degradation of the material of each of the bodies 16 and the material of each of the plates 41. This degradation would change the chemical structure of the material. Without the pigmentation of each of the bodies 16 and each of the plates 41, each of the bodies 16 and each of the plates 41 would crack and weather.

For water skiing, one would not have any of the ski poles 15. In this situation, it would not be necessary to utilize the plate 41. Instead, the strap 28 would be passed over the top of the skis 14 in the longitudinal passages 20 of the body 16 and the ends of the strap 28 connected to each other by the second clamp 44.

If desired, the body 16 may have a coating 47 (see FIG. 10) of a suitable polyvinyl. This may be accomplished by dipping. The polyvinyl coating 47 preferably has a thickness of about five mils to six mils. The polyvinyl coating 47 prevents scuffing of the body 16 and also enables it to be kept clean.

When the polyvinyl coating 47 is employed, it is pigmented to prevent ultraviolet degradation of the material of the body 16. With the use of the polyvinyl coating 47, it is not necessary to pigment the material of the body 16.

As one example of various dimensions of the body 16 and the plate 41, the upper wall 19 of the body 16 may have a width of 23" with the bottom wall 18 having a width of 24". The thickness of the body 16 may be 3" with the length being 3".

The depth of the transverse passage 28 would still be 1/16" as previously mentioned. Similarly, as previously discussed, the side walls 25 of the first cross sectional portion 23 of each of the longitudinal passages 20 would be spaced 0.5" from each other and extend ⅜" from the upper wall 19 while the radius of the circle having its arc define the second cross sectional portion 24 of each of the longitudinal passages 20 would be 9/16". The center lines of the four longitudinal passages 20 are spaced 6" from each other with the center line of each of the outboard longitudinal passages 20 being 2.5" from the end of the upper wall 19 of the body 16.

The plate 41 would have a width of 23" and a length of 3". Each of the slots 43 would have a length of 2" and a width of 0.5". The outboard side of each of the slots 43 would be disposed 1" from the end of the plate 41.

An advantage of this invention is that it may be quickly mounted on a vehicle roof and may be quickly removed therefrom. Another advantage of this invention is that it is easily stored. A further advantage of this invention is that it may be mounted on any width of an automobile roof. Still another advantage of this invention is that there is no damage to the vehicle roof when mounting or removing. A still further advantage of this invention is that it is relatively inexpensive. Yet another advantage of this invention is that it may be mounted or removed by one person.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:
1. A carrier for supporting skis on a vehicle roof including:
   a body of resilient material;
   said body having a bottom wall for engaging the vehicle roof on which said body is to be mounted transversely;
   said body having an upper wall substantially parallel to said bottom wall;
   said upper wall having a plurality of substantially parallel longitudinal passages therein to receive skis therein for support by said body;
   each of said longitudinal passages having a first cross sectional portion communicating with said upper wall and a second cross sectional portion communicating with said first cross sectional portion, said first cross sectional portion of said longitudinal passage being smaller than said second cross sectional portion of said longitudinal passage to grip skis disposed in said longitudinal passage;
   and said body having a transverse passage extending transversely to said longitudinal passages to receive means to releasably secure said body to the vehicle on which said body is to be mounted, said transverse passage being disposed beneath the bottom of each of said longitudinal passages.
2. The carrier according to claim 1 in which said body is formed of a plastic foam.
3. The carrier according to claim 2 in which said body is formed of cross linked polyethylene foam.
4. The carrier according to claim 3 in which said body has a vinyl coating.

5. The carrier according to claim 1 in which:

said first cross sectional portion of each of said longitudinal passages is a slot having substantially parallel side walls;

and said second cross sectional portion of each of said longitudinal passages is defined by an arc of a circle of larger radius than the distance between said side walls of said slot and terminating at the lower ends of said side walls of said slot.

6. The carrier according to claim 5 in which said body is formed of a plastic foam.

7. A carrier for supporting skis on a vehicle roof including:

a body of resilient material;

said body having a bottom wall for engaging the vehicle roof on which said body is to be mounted transversely;

said body having an upper wall substantially parallel to said bottom wall;

said upper wall having a plurality of substantially parallel longitudinal passages therein to receive skis therein for support by said body;

each of said longitudinal passages having a first cross sectional portion communicating with said upper wall and a second cross sectional portion communicating with said first cross sectional portion, said first cross sectional portion of said longitudinal passage being smaller than said second cross sectional portion of said longitudinal passage to grip skis disposed in said longitudinal passage;

said body having a transverse passage extending transversely to said longitudinal passages, said transverse passage being disposed beneath the bottom of each of said longitudinal passages;

and means extending through said transverse passage to releasably secure said body to the vehicle on which said body is to be mounted.

8. The carrier according to claim 7 in which said extending means includes:

a strap extending through said transverse passage, said strap being slidable in said transverse passage;

said strap having means fixedly located thereon between one end of said body and one end of said strap for attaching to a gutter or the like on one side of the vehicle on which said body is to be mounted;

said strap having means adjustably located thereon between the other end of said body and the other end of said strap for attaching to a gutter or the like on the other side of the vehicle on which said body is to be mounted;

and said strap having means to secure the two ends of said strap to each other to retain said body on the vehicle roof and the skis in said longitudinal passages.

9. The carrier according to claim 8 in which said body is formed of a plastic foam.

10. The carrier according to claim 9 in which said body is formed of cross linked polyethylene foam.

11. The carrier according to claim 10 in which said body has a vinyl coating.

12. The carrier according to claim 8 in which:

said first cross sectional portion of each of said longitudinal passages is a slot having substantially parallel side walls;

and said second cross sectional portion of each of said longitudinal passages is defined by an arc of a circle of larger radius than the distance between said side walls of said slot and terminating at the lower ends of said side walls of said slot.

13. The carrier according to claim 12 in which said body is formed of a plastic foam.

14. A carrier for supporting skis and ski poles on a vehicle roof including:

a body of resilient material;

said body having a bottom wall for engaging the vehicle roof on which said body is to be mounted transversely;

said body having an upper wall substantially parallel to said bottom wall;

said upper wall having receiving means to receive skis therein for support by said body;

said body having a transverse passage extending transversely to said receiving means and beneath said receiving means to receive means to releasably secure said body to the vehicle;

a plate for disposition on the skis disposed in said receiving means in said body to support ski poles disposed on said plate;

and said plate having means at each end to receive the means to releasably secure said body to the vehicle to also releasably secure said plate and ski poles supported on said plate to the vehicle.

15. The carrier according to claim 14 in which:

said receiving means of said body includes a plurality of substantially parallel longitudinal passages extending into said body from said upper wall;

and each of said longitudinal passages has a first cross sectional portion communicating with said upper wall and a second cross sectional portion communicating with said first cross sectional portion, said first cross sectional portion of said longitudinal passage is smaller than said second cross sectional portion of said longitudinal passage to grip skis disposed in said longitudinal passage.

16. The carrier according to claim 15 in which:

said first cross sectional portion of each of said longitudinal passages is a slot having substantially parallel side walls;

and said second cross sectional portion of each of said longitudinal passages is defined by an arc of a circle of larger radius than the distance between said side walls of said slot and terminating at the lower ends of said side walls of said slot.

17. The carrier according to claim 14 in which said plate has a width less than the width of said bottom wall of said body.

18. The carrier according to claim 17 in which:

said upper wall has its width less than the width of said bottom wall;

said plate has the same width as the width of said upper wall of said body;

and said body has its end walls inclined from said bottom wall to said upper wall.

19. The carrier according to claim 14 in which:

said body is formed of cross linked polyethylene foam; and said plate is formed of corrugated polypropylene.

20. A carrier for supporting skis and ski poles on a vehicle roof including:

a body of resilient material;

said body having a bottom wall for engaging the vehicle roof on which said body is to be mounted transversely;

said body having an upper wall substantially parallel to said bottom wall;

said upper wall having receiving means to receive skis therein for support by said body;

said body having a transverse passage extending transversely to said receiving means and beneath said receiving means;

means extending through said transverse passage to releasably secure said body to the vehicle on which said body is to be mounted;

a plate for disposition on the skis disposed in said receiving means in said body to support ski poles disposed on said plate;

and said plate having means at each end to receive said extending means to also releasably secure said plate and ski poles supported on said plate to the vehicle.

21. The carrier according to claim 20 in which said extending means includes:

a strap extending through said transverse passage, said strap being slidable in said transverse passage;

said strap having means fixedly located thereon between one end of said body and one end of said strap for attaching to a gutter or the like on one side of the vehicle on which said body is to be mounted;

said strap having means adjustably located thereon between the other end of said body and the other end of said strap for attaching to a gutter or the like on the other side of the vehicle on which said body is to be mounted;

and said strap having means to secure the two ends of said strap to each other to retain said body on the vehicle roof, the skis in said receiving means, said plate on the skis in said receiving means, and ski poles supported on said plate.

22. The carrier according to claim 21 in which:

said receiving means of said body includes a plurality of substantially parallel longitudinal passages extending into said body from said upper wall;

and each of said longitudinal passages has a first cross sectional portion communicating with said upper wall and a second cross sectional portion communicating with said first cross sectional portion, said first cross sectional portion of said longitudinal passage is smaller than said second cross sectional portion of said longitudinal passage to grip skis disposed in said longitudinal passage.

23. The carrier according to claim 22 in which:

said first cross sectional portion of each of said longitudinal passages is a slot having substantially parallel side walls;

and said second cross sectional portion of each of said longitudinal passages is defined by an arc of a circle of larger radius than the distance between said side walls of said slot and terminating at the lower ends of said side walls of said slot.

24. The carrier according to claim 21 in which said plate has a width less than the width of said bottom wall of said body.

25. The carrier according to claim 24 in which:

said upper wall has its width less than the width of said bottom wall;

said plate has the same width as the width of said upper wall of said body;

and said body has its end walls inclined from said bottom wall to said upper wall.

26. The carrier according to claim 21 in which:

said body is formed of cross linked polyethylene foam; and said plate is formed of corrugated polypropylene.

27. The carrier according to claim 20 in which:

said receiving means of said body includes a plurality of substantially parallel longitudinal passages extending into said body from said upper wall;

and each of said longitudinal passages has a first cross sectional portion communicating with said upper wall and a second cross sectional portion communicating with said first cross sectional portion, said first cross sectional portion of said longitudinal passage is smaller than said second cross sectional portion of said longitudinal passage to grip skis disposed in said longitudinal passage.

28. The carrier according to claim 27 in which:

said first cross sectional portion of each of said longitudinal passage is a slot having substantially parallel side walls;

and said second cross sectional portion of each of said longitudinal passages is defined by an arc of a circle of larger radius than the distance between said side walls of said slot and terminating at the lower ends of said side walls of said slot.

29. The carrier according to claim 20 in which said plate has a width less than the width of said bottom wall of said body.

30. The carrier according to claim 29 in which:

said upper wall has a width less than the width of said bottom wall;

said plate has the same width as the width of said upper wall of said body;

and said body has its end walls inclined from said bottom wall to said upper wall.

31. The carrier according to claim 20 in which:

said body is formed of cross linked polyethylene foam; and said plate is formed of corrugated polypropylene.

* * * * *

UNITED STATES PATENT AND TRADEMARK OFFICE
CERTIFICATE OF CORRECTION

PATENT NO. : 4,326,655
DATED : April 27, 1982
INVENTOR(S) : Walter A. Gradek; John W. Boggs It is certified that error appears in the above—identified patent and that said Letters Patent is hereby corrected as shown below:

Column 3, line 1, "an" should read ---any---.

Column 12, line 32, "passage" should read ---passages---.

Signed and Sealed this

Twenty-seventh Day of July 1982

[SEAL]

Attest:

Attesting Officer

GERALD J. MOSSINGHOFF
Commissioner of Patents and Trademarks